(No Model.)
J. M. BAILEY.
METHOD OF PRESERVING ENSILAGE IN SILO.
No. 247,595. Patented Sept. 27, 1881.
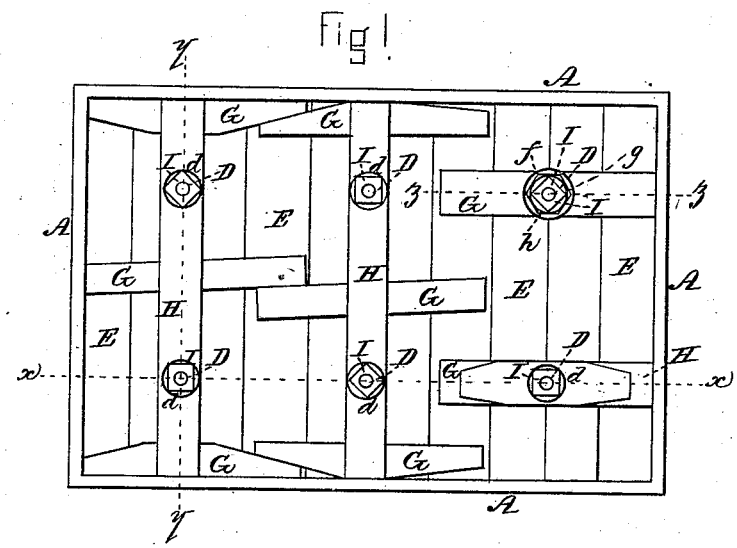
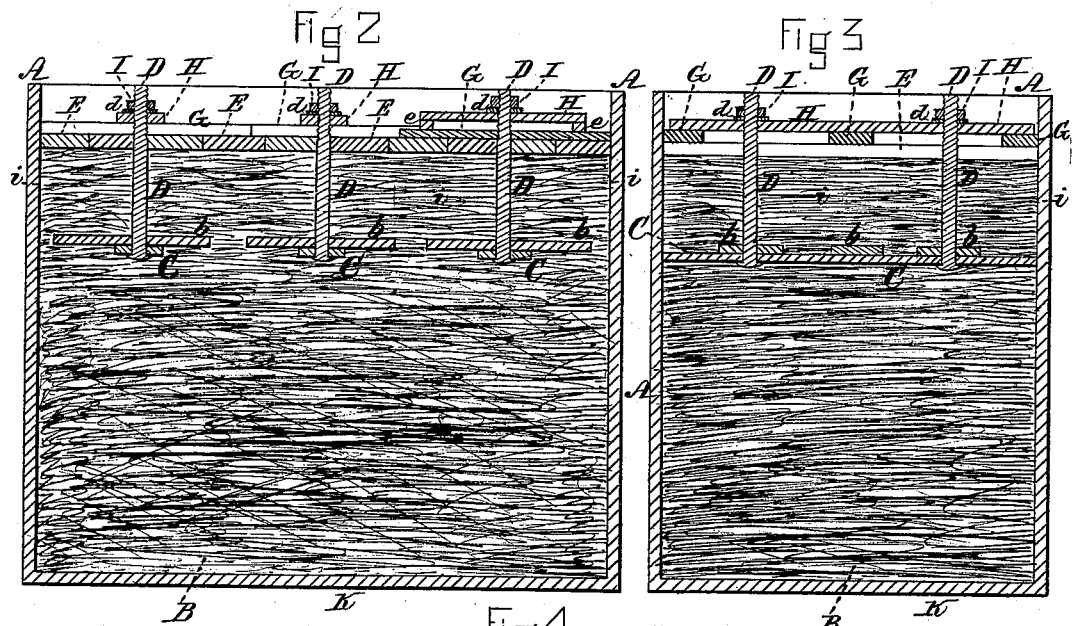
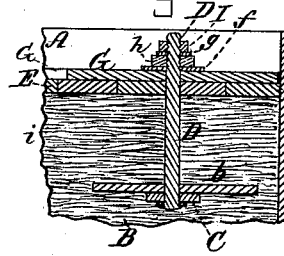
WITNESSES
N. J. Cambridge
J. Henry Gill.
INVENTOR
John M. Bailey
per R. E. Teschemacher
Atty.
N. PETERS, Photo-Lithographer, Washington, D. C.

UNITED STATES PATENT OFFICE.

JOHN M. BAILEY, OF BILLERICA, MASSACHUSETTS.

METHOD OF PRESERVING ENSILAGE IN SILOS.

SPECIFICATION forming part of Letters Patent No. 247,595, dated September 27, 1881.

Application filed July 29, 1881. (No model.)

*To all whom it may concern:*

Be it known that I, JOHN M. BAILEY, a citizen of the United States, residing at Billerica, in the county of Middlesex and State of Massachusetts, have invented an Improved Method of Preserving Ensilage in Silos, of which the following is a full, clear, and exact description, reference being had to the accompanying drawings, making part of this specification, in which—

Figure 1 is a plan of a silo, illustrating my improved method of preserving ensilage therein. Fig. 2 is a longitudinal vertical section on the line $x\,x$ of Fig. 1. Fig. 3 is a transverse vertical section on the line $y\,y$ of Fig. 1. Fig. 4 is a section on the line $z\,z$ of Fig. 1.

The usual method of compressing ensilage in "silos" or pits is to cover the top of the mass with planks, and place thereon stones or other heavy substances to the amount of about one hundred pounds to the square foot of surface-area. This method is exceedingly tedious and expensive, especially in sections of country where stone is scarce and difficult to obtain, as much labor is required in elevating the stones to the top of the silo, while the same objections apply to other heavy substances. This application of heavy weights is also liable to produce an undue compression of the lower portion of the ensilage, which causes the juices of the green plants to be pressed out at the bottom of the silo, thus involving the loss of the most valuable and digestible part of the forage.

To remedy the difficulties above mentioned, jack-screws have been placed between heavy timbers above and stringers laid upon the plank covering the ensilage, the heavy timbers being bolted securely to the walls of the silo; but this method is objectionable, as it necessitates the use of strong bolts passing through the walls of the silo from top to bottom, to firmly hold the timbers under which the jack-screws are placed. This device, which resembles a cider-press of the old construction, is necessarily expensive, and is, furthermore, objectionable, for the reason that in some seasons the silos may be entirely filled, and at other times, from drought or other causes which reduce the forage crops, only partially filled, the latter condition necessitating a great amount of blocking or building up to enable the screws to be used.

Ensilage has also been compressed by means of long bolts secured beneath the floor or bottom of the silo, and extending up through the entire mass of ensilage, and through stringers placed upon the plank covering, the upper ends of these bolts being threaded for the reception of screw-nuts, by turning which the whole mass was subjected to the desired amount of pressure. The disadvantages incident to this latter plan are that too much pressure is applied to the lower strata of the ensilage, which causes the valuable juices to exude therefrom and be lost, while the long bolts, being permanently fastened beneath the floor of the silo, are in the way, and seriously obstruct and interfere with the spreading and trampling of the ensilage in the operation of filling the silo, it being absolutely necessary to maintain a continuous trampling all the time that the silo is being filled; and as this operation is best performed with horses or oxen, it will be readily seen that the presence of a series of long vertical bolts or rods within the silo would interfere greatly with their use for this purpose.

Another serious objection to the placing of heavy weights on the top of the ensilage, or compressing the entire mass with screws, as heretofore, is that the lateral pressure on the walls of the silo is greatly increased, which necessitates much thicker and stronger walls, thus adding to the original cost of the structure. Furthermore, it would not answer to secure the lower ends of the long permanent bolts to wooden beams, on account of their liability to rapid decay when so located, and consequently large flat stones provided with apertures for the passage of the bolts must be provided, which are expensive and difficult to obtain in some localities, and as many silos are constructed with a depth of upward of twenty feet, bolts of suitable length would be quite expensive, especially as the upper ends would be required to be threaded for a considerable distance to allow the screw-nuts to have a sufficient range of motion to admit of their being tightened up as the mass shrinks and settles down, and if a long thread were not used the mass would have to be frequently loosened up to allow of the insertion of additional blocks.

My invention has for its object to overcome all of these difficulties; and it consists in a novel method of weighting or compressing the ensilage in a silo or p t with a part of the ensilage itself, which is accomplished by compressing a layer or stratum of the ensilage at the top of the mass by means of screw-bolts passing through stringers or pieces of wood or other suitable material placed above and below the layer, for the purpose of distributing and equalizing the pressure, which is produced by means of nuts screwed down over the threaded portions of the bolts, whereby the entire mass or body of the ensilage is compressed with the employment of short bolts extending only partially through it, thus effecting a material saving in the cost of the silo, and in the labor and expense of filling it with ensilage.

In the said drawings, A A represent the walls or sides of a silo or pit of the ordinary construction for containing ensilage, B, which is first placed therein and trampled down in the ordinary manner. As soon as the silo is partially filled, preferably to within about five feet of the level to which the ensilage is to extend, a series of planks, C, of suitable thickness, are placed upon the ensilage crosswise of the silo, as seen in Figs. 2 and 3, and at suitable distances apart. These planks are provided with apertures for the passage of vertical bolts D, having their heads and washers on the under side. Across each of these planks C are placed short pieces of plank $b$, the outside ones of which are provided with holes for the passage of the bolts, one or more of these short pieces $b$ being placed across the plank between the two bolts, the arrangement of the planks with respect to the bolts being such that each bolt will compress a surface-area of from twenty-five to thirty-six square feet.

When the bolts D, with their planks C $b$, have been distributed, as above described, over the entire surface of the ensilage, the filling of the silo is resumed, and as soon as it is filled to the required height and properly trampled down a flooring of planks, E, is laid on the top of the mass, the planks which extend transversely across the silo being provided with suitable apertures or notches through which the upper ends of the bolts D project, as seen in Figs. 2 and 3.

Short pieces of joist G, about three by six inches, and about two feet longer than the distances between the bolts D, are placed at the opposite ends of the planks E, and also at or near the center of the silo, equidistant from the bolts, as seen in Fig. 1, these joists G lapping at the ends, so as to form a continuous stringer.

At the ends of the silo, and at or near its center, planks H, of sufficient thickness to form stiff springs, are placed crosswise, resting at each end and at the center upon the joists G, apertures being made in the planks H for the passage of the bolts D, which are provided with screw-threads at their upper ends, over which are turned nuts I, which rest upon washers $d$ on the upper surface of the planks H.

At the right-hand end of Fig. 1 one of the planks H is shown turned around, so as to be parallel with the sides of the silo, its opposite ends resting on blocks $e$, placed upon one of the joists G, and at the opposite corner the bolt D projects up through a joist, G, on which is placed a washer, $f$, between which and another washer, $g$, on which the screw-nut bears, is placed a rubber or other suitable spring, $h$, as seen in Fig. 4. These devices I regard as equivalent methods of producing a yielding or spring pressure, and either may be used, as preferred. By thus turning the screw-nuts I down the upper portion or layer, $i$, of the ensilage B lying between the plank covering E and the planks C and $b$ is compressed to any desired degree of solidity, as seen in Figs. 2 and 3. This layer or stratum $i$ will weigh from fifty to sixty pounds to the cubic foot, and consequently a layer four feet in thickness will press upon the mass below with a pressure of upward of two hundred pounds to the square foot of surface-area, which is sufficient to exclude the air and prevent fermentation, thus insuring the preservation of that portion of the ensilage below the layer $i$. By thus compressing the upper layer or portion, $i$, of the ensilage, as described, by means of short bolts D, arranged in close proximity with each other, the lateral pressure on the walls of the silo is reduced to a minimum, and the compressed ensilage between the planks E and C $b$ is made to furnish the required weight to compress the lower portion of the mass between the planks C $b$ and the bottom K of the silo, no additional weight or pressure being applied in any manner whatsoever, thus entirely dispensing with the heavy stones or other substances heretofore placed upon the covering at the top of the silo, while the expense of the whole apparatus for compressing the upper layer of ensilage will not be one-fourth as much as that of the jack-screws and their adjuncts, or the long permanent bolts extending from the bottom to the top of the silo, heretofore used.

It will always be easy to ascertain when the green forage is all in the silo, with the exception of enough to form a layer of a thickness somewhat less than the length of the bolts D, after which these bolts, with the planks C and $b$, can be placed in position. Up to this time there is nothing in the silo to prevent the employment of horses or oxen to trample the ensilage. Furthermore, the bolts D are always of the right length, so that no blocking up is needed, and as the reduction of thickness under compression in this layer $i$, which will always be of the proper thickness, is much less than would occur in the whole mass, the labor of turning down the nuts I is proportionately reduced, while the cost of the short bolts D is very much less than that of the long bolts hitherto employed. Moreover, any of the juices of the green forage which may exude from the upper layer, $i$, when compressed, will run down into and be absorbed by the lower portion of the ensilage, and its loss thus avoided.

In feeding out the contents of a silo it is essential that it be uncovered no faster than it is fed out. With long permanent bolts the pressure would have to be removed from about one hundred and forty-four square feet at once to admit of any portion of the ensilage being taken out; whereas with my improved method of employing short movable bolts D and sectional stringers or joists G, lapping each other, only about four feet in length would require to be relieved of pressure at once, and when the ensilage is removed from this area down to the planks C and $b$ the bolt D at this point can be removed altogether, the ensilage below the planks C and $b$ having been sufficiently compressed by the weight of the layer $i$ over it.

I am aware that in an ordinary silo the weight of the upper portion of the ensilage produces a compression of the lower portion thereof; but in such case the upper portion requires to be also compressed with equal force, which must be effected by heavy weights, or the power of jack-screws applied to the upper surface of the mass. I do not, therefore, claim, broadly, compressing the lower portion of the ensilage in a silo by the weight of the upper portion; neither do I claim, broadly, compressing ensilage in silos by means of screw-bolts and nuts, nor covering the ensilage with planks and arranging cross-pieces or joists thereon for the screw-nuts to act upon; but

What I claim as my invention, and desire to secure by Letters Patent, is—

1. The herein-described process of weighting ensilage in silos, the same consisting in compressing, by means of short removable bolts and screw-nuts, the upper portion or stratum of the ensilage, which is confined between suitable planks or pieces of wood or other material, and employing the said compressed stratum of ensilage as a weight for compressing the remaining or lower portion of the ensilage in the silo, substantially as and for the purpose set forth.

2. In a silo, the combination, with the planks C, $b$, and E, and joists or stringers G, of the short removable bolts D, provided with screw-nuts I, and adapted to extend only partially through the mass of ensilage, for the purpose of compressing the top layer or stratum thereof, which acts as a weight for producing the required compression of the remaining or lower portion of the ensilage in the silo, substantially as described.

3. In a silo, the combination, with the planks C, $b$, and E, and removable bolts D, with their screw-nuts I, of the short joists G, arranged with their ends overlapping each other, to form a continuous stringer adapted to be removed in sections in order to release the minimum quantity of ensilage from pressure at a time, and used with or without the spring-planks H, substantially as set forth.

Witness my hand this 22d day of July, A. D. 1881.

JOHN M. BAILEY.

In presence of—
P. E. TESCHEMACHER,
W. J. CAMBRIDGE.